US010499360B2

(12) United States Patent
Korrub

(10) Patent No.: US 10,499,360 B2
(45) Date of Patent: *Dec. 3, 2019

(54) PASSIVE WIRELESS ELECTRONICS DETECTION SYSTEM

(71) Applicant: Geoffrey E Korrub, Austin, TX (US)

(72) Inventor: Geoffrey E Korrub, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,965

(22) Filed: Oct. 1, 2018

(65) Prior Publication Data

US 2019/0037528 A1    Jan. 31, 2019

Related U.S. Application Data

(63) Continuation-in-part of application No. 15/634,174, filed on Jun. 27, 2017, now Pat. No. 10,165,439.

(51) Int. Cl.
*H04W 64/00* (2009.01)
*G06F 16/16* (2019.01)
*G06K 7/08* (2006.01)
*H04L 29/08* (2006.01)
*H04N 5/765* (2006.01)
*H04N 5/232* (2006.01)

(52) U.S. Cl.
CPC ........ *H04W 64/003* (2013.01); *G06F 16/164* (2019.01); *G06K 7/086* (2013.01); *H04L 67/125* (2013.01); *H04N 5/23203* (2013.01); *H04N 5/765* (2013.01)

(58) Field of Classification Search
CPC ... H04W 64/003; G06F 16/164; G06K 7/086; H04L 67/125
USPC ..................................... 340/539.11
See application file for complete search history.

(56) References Cited

U.S. PATENT DOCUMENTS

| | | | |
|---|---|---|---|
| 6,874,037 B1 * | 3/2005 | Abram | H04L 7/10 709/248 |
| 9,112,994 B2 * | 8/2015 | Yamada | G06F 3/0482 |
| 9,142,122 B2 * | 9/2015 | Oshima | G08C 17/02 |
| 9,165,144 B1 * | 10/2015 | Goldstein | G06F 21/60 |
| 9,613,512 B2 * | 4/2017 | Williams | H04W 4/043 |
| 9,626,677 B2 * | 4/2017 | Turgeman | G06Q 20/4016 |
| 9,756,549 B2 * | 9/2017 | Perdomo | H04W 40/12 |
| 9,853,719 B2 * | 12/2017 | Krochmal | H04B 7/26 |
| 10,165,439 B1 * | 12/2018 | Korrub | H04W 12/02 |
| 2017/0328997 A1 * | 11/2017 | Silverstein | G01S 7/41 |

* cited by examiner

*Primary Examiner* — John A Tweel, Jr.

(57) ABSTRACT

A passive wireless electronics detection system is disclosed having one or more radio antenna assemblies able to receive digital data from a wireless electronic device located within a predetermined range, and storage associated with the radio antenna assemblies for storing at least some of the digital data received. The storage is through connection to the internet, or can be local to the antenna assemblies. The digital data includes wireless device meta-data such as the device name, MAC address, BSSID, previous Wi-Fi networks connected to, etc. A device listing is complied through frequency of detection or user input, and an alert may be triggered when an unexpected device is detected, which can then be sent to one or more digital devices.

5 Claims, 4 Drawing Sheets

PASSIVE WIRELESS ELECTRONICS DETECTION SYSTEM

BACKGROUND OF THE INVENTION

Field of the Invention

The present invention refers in general to the field of wireless local area networking technology, and more particularly, to a passive wireless electronics detection system.

Description of Related Art

Wi-Fi or WiFi is a technology for wireless local area networking with devices based on the IEEE 802.11 standards. Wi-Fi is a trademark of the Wi-Fi Alliance, which restricts the use of the term Wi-Fi Certified to products that successfully complete interoperability certification testing. Devices that can use Wi-Fi technology include, but are not limited to, personal computers, video-game consoles, smart phones, digital cameras, tablet computers, digital audio players and printers. Wi-Fi compatible devices can connect to the Internet via a WLAN and a wireless access point. Such an access point (or hotspot) has a range of about 20 meters (66 feet) indoors and a greater range outdoors. Hotspot coverage can be as small as a single room with walls that block radio waves, or as large as many square kilometers achieved by using multiple overlapping access points. Wi-Fi most commonly uses the 2.4 gigahertz (12 cm) UHF and 5 gigahertz (6 cm) SHF ISM radio bands.

Bluetooth is a wireless technology standard for exchanging data over short distances, using short-wavelength UHF radio waves in the ISM band from 2.4 to 2.485 GHz, from fixed and mobile devices, and building personal area networks (PANs).

Bluetooth Low Energy (Bluetooth LE or BLE) is a wireless personal area network technology designed and marketed by the Bluetooth Special Interest Group aimed at novel applications in the healthcare, fitness, beacons, security, and home entertainment industries. Compared to classic Bluetooth, BLE is intended to provide considerably reduced power consumption and cost while maintaining a similar communication range.

Wireless electronic devices equipped when in the on, powered up position are regularly sending out signals trying to detect and connect with a network. In doing so, the device sends meta-data about the device to the entry port, and the entry port sends connection data to the device so that, all other parameters being satisfied, the device can connect to the entry port.

BRIEF SUMMARY OF THE INVENTION

It is an object of the present invention to provide an improved passive wireless electronics detection system.

It is a related object of the present invention to provide an improved passive wireless electronics detection system that acquires and stores identification information about each wireless electronic device detected.

It is another object of the present invention to provide an enhanced security system.

It is a further object of the present invention to provide an improved attendance system.

In accordance with another preferred embodiment of the present invention, a passive wireless electronics detection system comprises one or more radio antenna assemblies able to receive digital data from a wireless electronic device located within a predetermined range and storage associated with the one or more radio antenna assemblies for storing at least some of the digital data received.

Other objects and advantages will become apparent from the following descriptions, taken in connection with the accompanying drawings, wherein, by way of illustration and example, embodiments of the present invention are disclosed.

BRIEF DESCRIPTION OF THE FIGURES

The novel features believed to be characteristic of the invention are set forth in the appended claims and claims yet to be filed. However, the invention itself, as well as preferred modes of use and further objectives and advantages thereof, will best be understood by reference to the following detailed description when read in conjunction with the accompanying Figures wherein:

DETAILED DESCRIPTION OF THE PREFERRED EMBODIMENTS

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
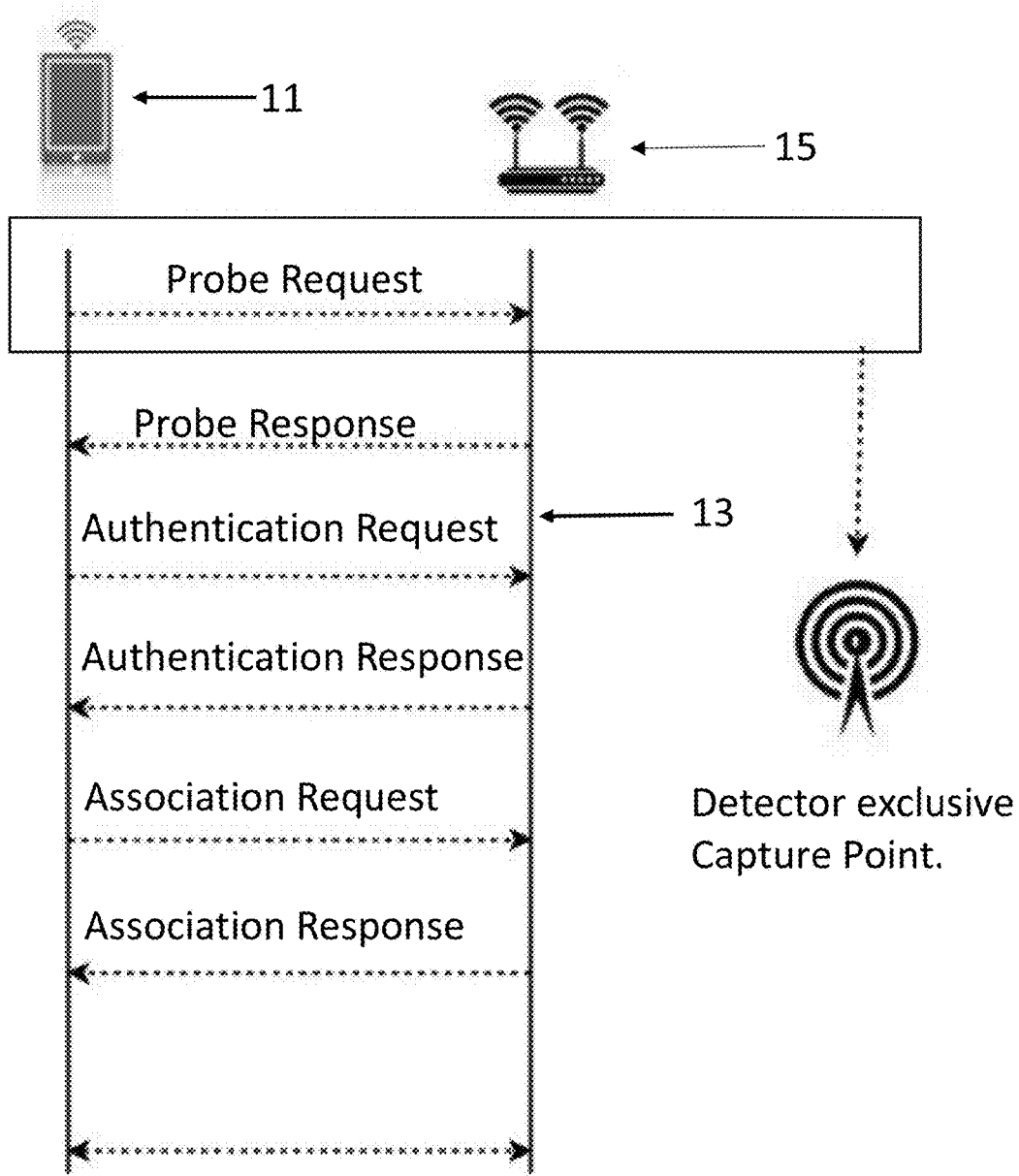
FIG. 1 is a schematic of a typical wireless network detection of an electronic device showing the handshake step in authentication and association.

A typical handshake procedure between a wireless electronic device and an access port is illustrated in FIG. 1. A wireless electronic device, or mobile station, 11 sends probe requests to discover 802.11 networks 13 within its proximity. Probe requests advertise the mobile stations supported data rates and 802.11 capabilities such as 802.11n. Because the probe request is sent from mobile station 11 to the destination layer-2 address and BSSID of ff:ff:ff:ff:ff:ff, all wireless access points 15 or AP's that receive it will respond. Mobile device 11 may be a mobile phone, tablet, laptop, Bluetooth enabled device, low energy Bluetooth enabled device, or any other similar device.

AP's receiving the probe request check to see if mobile station 11 has at least one common supported data rate. If they have compatible data rates, a probe response is sent advertising the SSID, i.e., wireless network name, supported data rates, encryption types if required, and other 802.11 capabilities of the AP.

Mobile station 11 then chooses compatible networks from the probe responses it receives. Compatibility could be based on a variety of factors such as encryption type. Once compatible networks are discovered mobile station 11 will attempt low-level 802.11 authentication with compatible APs. 802.11 authentication is not the same as WPA2 or 802.1X authentication mechanisms which occur after a mobile station is authenticated and associated. 802.11 authentication frames are open and almost always succeed.

Mobile station 11 sends a low-level 802.11 authentication frame to an AP setting the authentication to open and the sequence to 0x0001. The AP receives the authentication frame and responds to mobile station 11 with authentication frame set to open, indicating a sequence of 0x0002. If an AP receives any frame other than an authentication or probe request from mobile station 11 it will respond with a deauthentication frame placing the mobile station into an unauthenticated or an unassociated state. The station will then have to begin the association process from the low level authentication step. At this point mobile station 11 is authenticated but not yet associated. Some 802.11 capabilities allow a mobile station to low-level authenticate to multiple AP's, which speeds up the association process when moving between AP's. While mobile station 11 can be 802.11 authenticated to multiple AP's, it can only be actively associated and transferring data through a single AP at a time.

Once mobile station 11 determines which AP it would like to associate to, it will send an association request to that AP. The association request contains chosen encryption types if required and other compatible 802.11 capabilities. When an AP receives a frame from a mobile station that is authenticated but not yet associated, it will respond with a disassociation frame placing the mobile into an authenticated but unassociated state. If the elements in the association request match the capabilities of the AP, the AP will create an Association ID for the mobile station and respond with an association response with a success message granting network access to the mobile station. Mobile station 11 is then successfully associated to the AP and data transfer can begin.

If WPA/WPA2 or 802.1X authentication is required on the wireless network, mobile station 11 will not be able to send data until dynamic keying and authentication have taken place after the 802.11 Association is complete.

Figure 2:
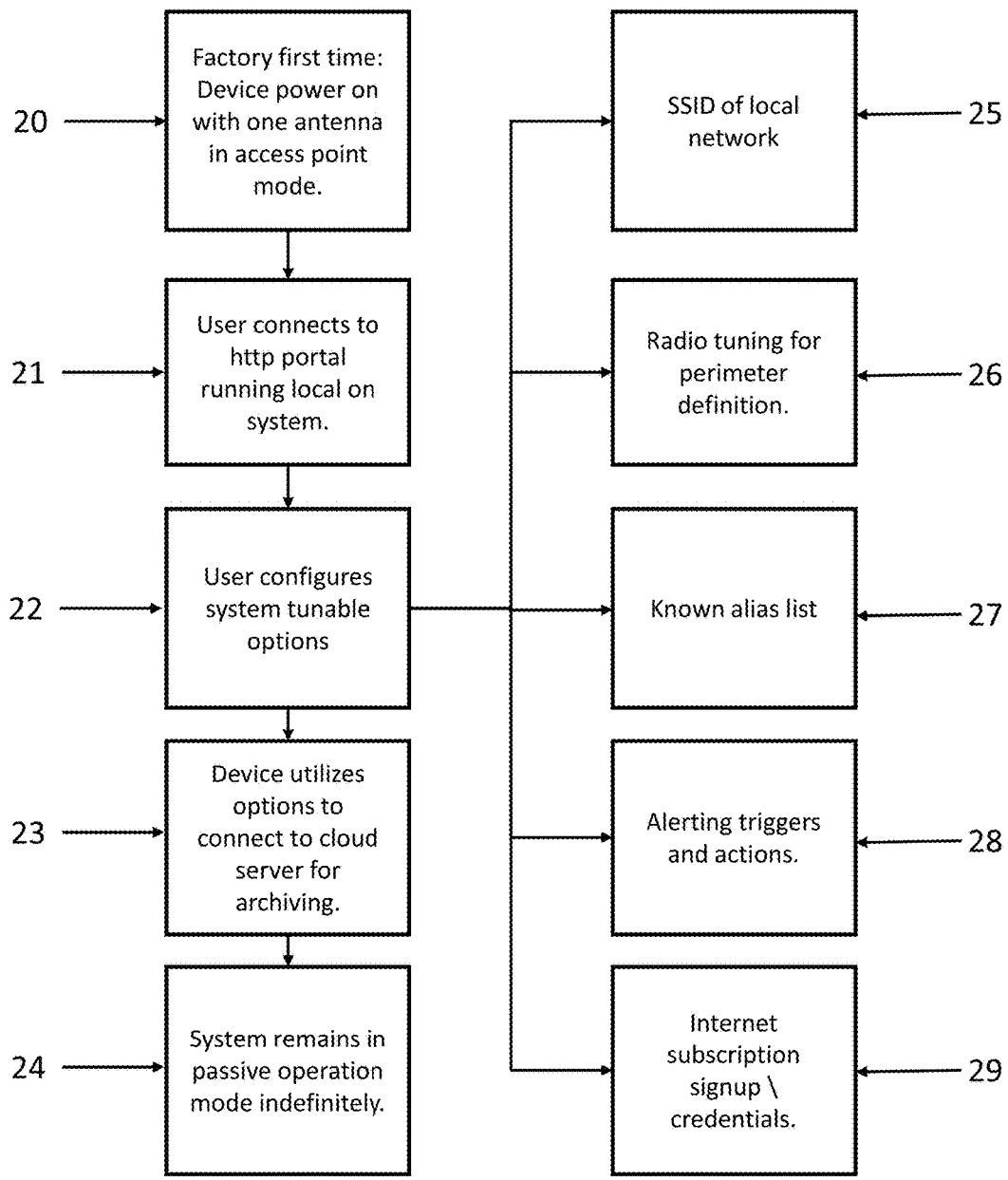
FIG. 2 is a flow diagram of the setup procedures for a passive wireless electronics detection system in accordance with a preferred embodiment of the present invention.

Turning next to FIG. 2, there is shown a flow diagram of the setup procedures for a passive wireless electronics detection system in accordance with a preferred embodiment of the present invention. Although shown as a one antenna assembly configuration, it will be appreciated that more than one antenna assembly may be employed. After powering on at step 20, the device will establish a geo-fence perimeter based on the antenna or configured sensitivity. In accordance with the illustrated embodiment of the invention, the device will utilize a communication port to provide a configuration interface running local on a system at step 21. As shown in step 22, the user may then configure the system in a number of tunable options. Such options include establishing the SSID of a local network 25, perimeter definition 26, establishing a known list of electronic device aliases 27, alerting triggers and associated actions 28, and establishing internet subscription signup or credentials 29.

In the preferred embodiment, the device will remain in a passive mode and be configured for logging or archiving of detected wireless electronic devices 24, which may include local storage, a private server, or cloud based storage 23. An alias list configuration for known devices may be created by the user or, in the alternative, by the device using dynamic learning.

The passive wireless electronics detection system includes one or more radio antenna assemblies able to receive digital data from a wireless electronic device 11 located within a predetermined range and storage associated with the one or more radio antenna assemblies for storing at least some of the digital data received. The digital data may include the wireless device meta-data such as the device name, MAC address, previous wireless networks to which it was connected, BSSID, time and date information, operating system, and device hardware information not listed.

Figure 3:
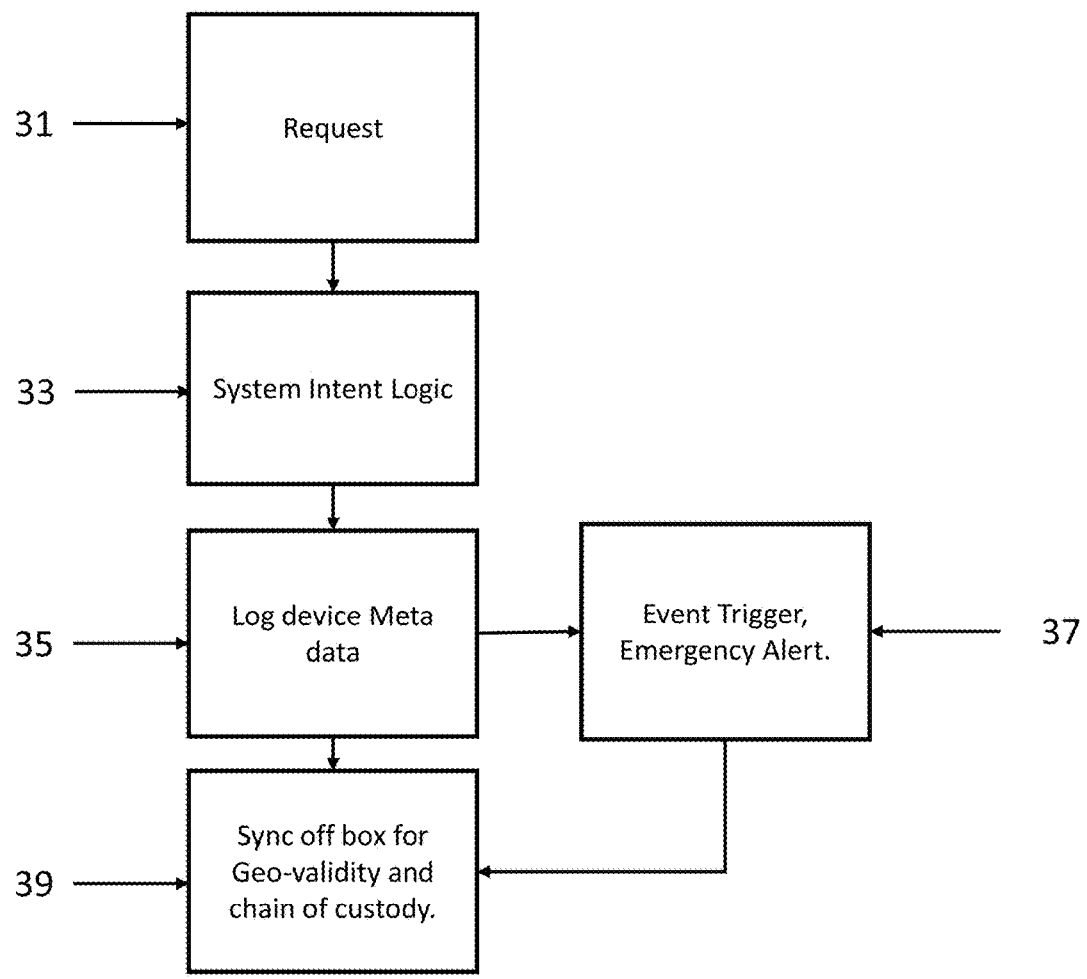
FIG. 3 is a flow diagram of the operational overview for a passive wireless electronics detection system in accordance with a preferred embodiment of the present invention.

Turning next to FIG. 3, there is a flow diagram of the operational overview for a passive wireless electronics detection system in accordance with a preferred embodiment of the present invention. In the preferred embodiment, the device remains in a listen mode, and logs meta-data containing device information whenever a wireless electronic device is within the configured range. The system will acquire additional identifying data where legally permitted, including periodic probe packets, where legally permitted.

When a device 11 is detected the system will log the device, and may continue to log information after the first discovery of the device 31. Through system intent logic 33, a variety of steps may be taken 37. As an example, after a pre-determined time period, devices can be presumed gone and re-discoverable. Unknown devices are detected through the detector antenna assembly and captured Meta data about the device is logged along with a time stamp from a GPS or a local clock at 35. The system log destination may provide verifying timestamp information, and location information. An optional GPS solution may provide fuller accuracy.

A cloud server may use Geo information from the sending detector for location information, and may further timestamp discovery receipt. The system may also be configured to log persistently to maintain time in, time out information.

Meta-data may include the wireless electronic device name, device MAC address, and other unique IDs including, but not limited to, UDID, Serial Number IMEI, ICCID, MEID. SSID preference details may also be logged including SSID connection history.

The system communication port may be Wi-Fi, Bluetooth, Ethernet, Cellular and of other data transport method proprietary or standard, or any combination thereof. The antenna, either dedicated or shared, is capable of receiving common communications transmissions from commercially available wireless devices. Upon detecting an unknown or unanticipated wireless electronic device detection, an event trigger may be initiated 37. As an example, an alarm may be triggered. The alarm may cause a text or phone message to be sent, or include actions within an existing security or home automation system, such as activating cameras or lights.

An identification of all devices detected within a time period may then be generated, validated, and used to identify individuals entering and leaving the geo-perimeter 39.

It is readily apparent that the above described passive wireless electronics detection system may be used as a security system in the manner of detecting such devices and storing the device information that may be carried into a crime scene within the geo-fence. In addition, such a system can be used to determine when certain devices leave the geo-fence.

Figure 4:
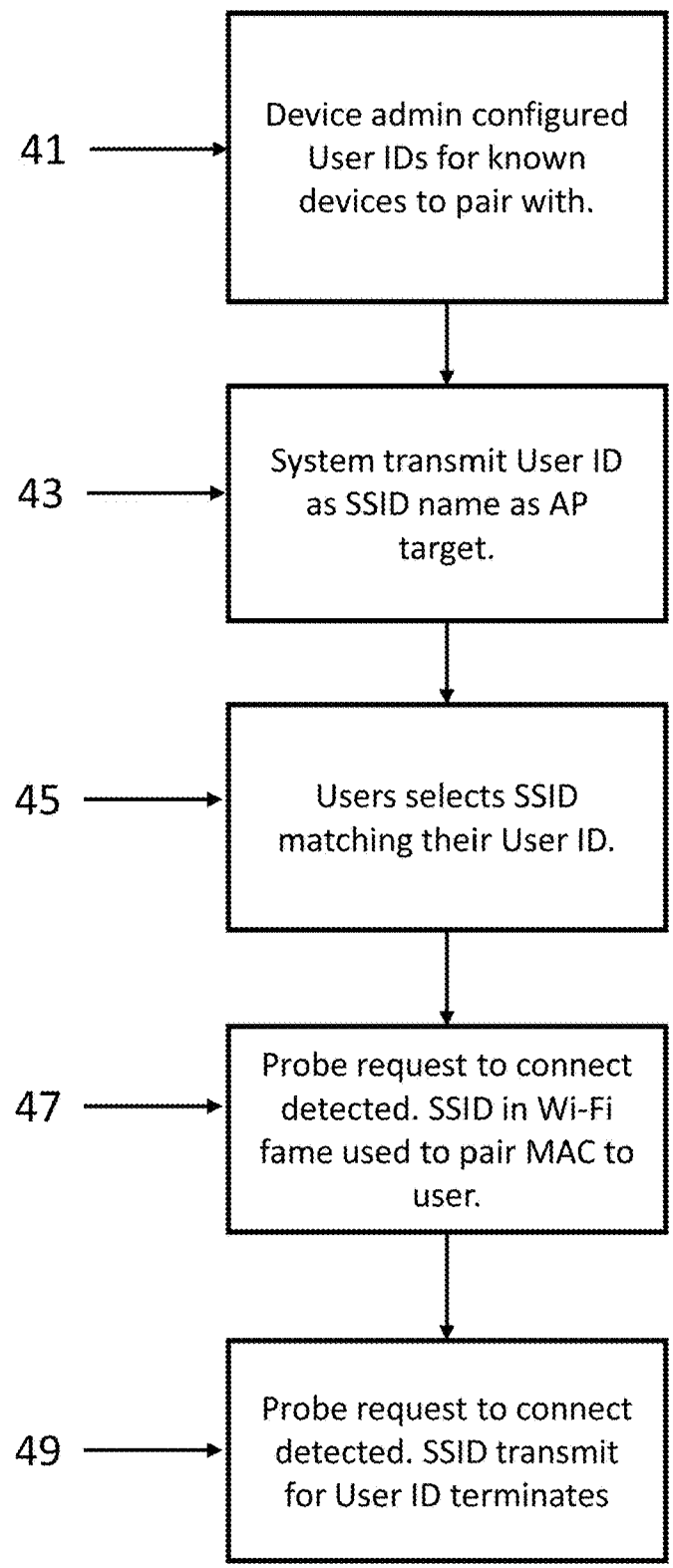
FIG. 4 is a flow diagram of a passive wireless electronic detection system in accordance with an alternate embodiment of the present invention.

The system may also be used as a login system, as in attendance verification, allowing users to login and self identify, as is illustrated in FIG. 4. In this embodiment, a list of known devices is established. In the previous examples, there is not a list of known devices that is generated, and in those embodiments, there is no comparison, or checking, between detected devices and a list of known, or registered, devices. For example, in a classroom setting, an active radio may be on the probe device and creates SSIDs for each pre-configured, or bound, student in the system 41, 43. Students may be instructed to open their wifi settings and find the SSID with their name 45. Once they select their name from the list, the active radio stops broadcasting that SSID and there is no connection or response sent from the probe 47, 49. Seeing the SSID setup request from the MAC address ties the MAC address to the student for whom the SSID is named. Since the setup is not completed and the SSID no longer exists, no interference with traditional function occurs. The system may then passively detect the times each MAC address associated with a student is within the geo-fence, and an attendance record may be compiled.

While the invention has been described in connection with preferred embodiments, it is not intended to limit the scope of the invention to the particular forms set forth, but on the contrary, it is intended to cover such alternatives, modifications, and equivalents as may be included within the spirit and scope of the invention as defined by the appended claims, and claims that may issue.

What is claimed:

1. A method for capturing the presence of radio frequency (RF) transmitting devices comprising:
   collecting, using at least one sensor, RF data in one or more spectrums associated with the devices;
   extracting metadata properties;
   determining transmitting device information;
   logging session and device properties for each device detected; and
   exporting at least a portion of data collected and or logged.

2. The method of claim 1 wherein the collected RF transmissions have no predetermined size.

3. The method of claim 1 further converting the collected RF data into data frames.

4. The method of claim 1 further comprising extracting metadata through applying frame format.

5. The method of claim 1 further using system logic based at least in part on extracted device metadata.

* * * * *